United States Patent
Panda et al.

(10) Patent No.: US 11,654,506 B2
(45) Date of Patent: May 23, 2023

(54) PROCESSING ROUTE TO DESIGN AND MANUFACTURE HIGHLY CONFIGURABLE NON-MAGNETIC DOWN-HOLE SENSOR COLLARS

(71) Applicant: Halliburton Energy Services, Inc., Houston, TX (US)

(72) Inventors: Krutibas Panda, Houston, TX (US); Michael Dewayne Finke, Houston, TX (US); Brian David Breaux, Houston, TX (US); Gregory D. Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/508,398

(22) Filed: Oct. 22, 2021

(65) Prior Publication Data

US 2023/0130962 A1    Apr. 27, 2023

(51) Int. Cl.
 *B23K 20/12* (2006.01)
 *E21B 17/00* (2006.01)
 (Continued)

(52) U.S. Cl.
 CPC .......... *B23K 20/121* (2013.01); *B23K 20/129* (2013.01); *E21B 17/006* (2013.01); *E21B 17/04* (2013.01); *B23K 2101/04* (2018.08)

(58) Field of Classification Search
 CPC ............... B23K 20/121; B23K 20/129; B23K 2101/04; B23K 20/12–1215;
 (Continued)

(56) References Cited

U.S. PATENT DOCUMENTS 2,263,579 A * 11/1941 Hokanson ............. E21B 17/046
                                                    175/320
3,134,278 A * 5/1964 Hollander ............. B23K 20/12
                                                    228/114.5
(Continued)

FOREIGN PATENT DOCUMENTS

CA      2720912 C  *  9/2012  ............. E21B 1/00
CA      2790080 A1 *  3/2013  ........... B23K 20/129
(Continued)

OTHER PUBLICATIONS

Inertia Friction Welder for Drill Pipe—Model 400BX, https://www.youtube.com/watch?v=AZGyhBYdxSc.
(Continued)

*Primary Examiner* — Kiley S Stoner
(74) *Attorney, Agent, or Firm* — Conley Rose, P.C.; Rodney B. Carroll

(57) ABSTRACT

Drill collars may be constructed using solid-state welding processes. Solid-state welding produces robust drill collars with high fatigue lifespans and permits individual segments of the drill collar to be optimized based on their intended use. A drill collar may be formed of a first segment with a different material, density, modulus of elasticity and/or geometry than an adjacent second segment fused thereto. If a segment of a drill collar is damaged in use, the damaged segment may be removed and replaced, possibly without de-rating the drill collar. Methods of forming the solid-state welds may include friction welding adjacent segments to one another such that features in each segment are circumferentially aligned when the weld is formed. Supplemental energy sources may provide additional heat at the welded surfaces to ensure the segments are effectively fused.

20 Claims, 9 Drawing Sheets

(51) Int. Cl.
  *E21B 17/04* (2006.01)
  *B23K 101/04* (2006.01)
(58) Field of Classification Search
  CPC ..... B23K 20/1285–1295; E21B 17/006; E21B 17/04
  USPC .............................. 228/112.1–114.5, 2.1–2.3
  See application file for complete search history.

(56) References Cited

U.S. PATENT DOCUMENTS

| | | | | |
|---|---|---|---|---|
| 3,234,645 | A * | 2/1966 | Hollander | B23K 20/12 228/113 |
| 3,234,646 | A * | 2/1966 | Hollander | B23K 20/12 228/113 |
| 3,234,647 | A * | 2/1966 | Hollander | B23K 20/12 228/113 |
| 3,269,002 | A * | 8/1966 | Hollander | B23K 20/12 228/113 |
| 3,269,003 | A * | 8/1966 | Hollander | B23K 20/12 228/114.5 |
| 4,181,845 | A | 1/1980 | Bolton | |
| 4,944,977 | A * | 7/1990 | Shantz | B29C 65/0672 428/35.8 |
| 6,907,944 | B2 | 6/2005 | Sale et al. | |
| 9,493,993 | B1 * | 11/2016 | Dallas | E21B 17/04 |
| 9,816,328 | B2 * | 11/2017 | Jiang | E21B 17/00 |
| 2006/0266797 | A1 * | 11/2006 | Kainer | B23K 20/12 228/101 |
| 2009/0224024 | A1 | 9/2009 | Kawaura et al. | |
| 2012/0055672 | A1 * | 3/2012 | Tollefsen | E21B 21/00 166/57 |
| 2012/0306199 | A1 * | 12/2012 | David | B23K 33/006 285/333 |
| 2013/0313025 | A1 * | 11/2013 | Aung | B23K 20/129 175/325.1 |
| 2014/0103643 | A1 * | 4/2014 | Jiang | E21B 17/04 285/288.1 |
| 2014/0291033 | A1 * | 10/2014 | Amundsen | B23K 10/02 76/108.4 |
| 2015/0176341 | A1 * | 6/2015 | Hughes | E21B 17/042 166/242.6 |
| 2016/0258227 | A1 | 9/2016 | Vemuri | |
| 2017/0175460 | A1 * | 6/2017 | Mansour | B23K 33/006 |
| 2019/0299326 | A1 * | 10/2019 | Badrak | B23K 20/233 |
| 2020/0018124 | A1 * | 1/2020 | Hohl | E21B 17/1042 |
| 2021/0079738 | A1 * | 3/2021 | Peters | F16F 9/52 |
| 2022/0196110 | A1 * | 6/2022 | Simanowski | E21B 17/04 |

FOREIGN PATENT DOCUMENTS

| | | | | |
|---|---|---|---|---|
| CN | 201172148 Y | | 12/2008 | |
| CN | 105317884 A | * | 2/2016 | ............ B23K 20/12 |
| CN | 107420049 A | * | 12/2017 | ............ B23K 20/12 |
| CN | 108817646 A | * | 11/2018 | |
| CN | 108868655 A | * | 11/2018 | ............ E21B 17/04 |
| CN | 108907446 A | * | 11/2018 | |
| CN | 108907447 A | * | 11/2018 | ......... B23K 20/1225 |
| CN | 110076441 A | * | 8/2019 | ............ B23K 20/12 |
| CN | 110219605 A | * | 9/2019 | ........... E21B 17/046 |
| CN | 110280890 A | * | 9/2019 | |
| CN | 114074210 A | * | 2/2022 | ......... B23K 20/1255 |
| DE | 102010049872 A1 | * | 5/2012 | ............ B23K 20/12 |
| DE | 102019218967 A1 | * | 6/2021 | |
| EP | 0138603 A2 | * | 4/1985 | |
| EP | 1166947 A1 | * | 1/2002 | ........... B23K 20/129 |
| EP | 3053698 B1 | * | 3/2020 | ........... B23K 20/028 |
| GB | 2527852 A | * | 1/2016 | ............ E21B 17/00 |
| JP | 2015042891 A | * | 3/2015 | ............ B23K 20/12 |
| KR | 101843755 B1 | * | 3/2018 | |
| WO | WO-2006008123 A1 | * | 1/2006 | ............ B23K 20/12 |
| WO | WO-2012003016 A1 | * | 1/2012 | ........... B23K 20/129 |
| WO | 2013122573 A1 | | 8/2013 | |
| WO | WO-2020010782 A1 | * | 1/2020 | ......... B23K 20/1225 |
| WO | WO-2020197970 A1 | * | 10/2020 | ............ E21B 4/003 |
| WO | WO-2021050335 A1 | * | 3/2021 | ............ E21B 12/00 |
| WO | WO-2021050930 A1 | * | 3/2021 | ........... E21B 17/042 |

OTHER PUBLICATIONS

Foreign Communication from Related Application—International Search Report and Written Opinion of the International Searching Authority, International Application No. PCT/US2022/076326, dated Dec. 28, 2022, 11 pages.

* cited by examiner

| Properties | | Base Material | Traditional Stub Welding | Solid State Stub Welding |
|---|---|---|---|---|
| Mechanical Properties | Tensile, ksi | 155.2 | 102 | 144, 148 |
| | Yield, ksi | 143.6 | 82 | 112, 116 |
| | Elongation, % | 25 | 20 | 8.5, 9.5 |
| | Charpy, ft.lb | 131 | 93, 90, 93 | 65, 48, 52 |

FIG. 9

PROCESSING ROUTE TO DESIGN AND MANUFACTURE HIGHLY CONFIGURABLE NON-MAGNETIC DOWN-HOLE SENSOR COLLARS

BACKGROUND

The present disclosure relates generally to downhole drill string components and the manufacture of these components. Example embodiments described herein relate to drill string collars formed of a plurality of sections that are fused to one another and each provide distinct performance characteristics.

Hydrocarbons and other resources may be recovered from geologic formations by drilling a wellbore into the formation, and then producing the resources through the wellbore to the surface. A wellbore drilling system may include a drill bit carried at an end of an elongated string of interconnected tubing components called a drill string. The drill string may be rotated to turn the drill bit and a drilling fluid may be pumped through the drill string to lubricate and cool the drill bit and to carry cuttings from the drill bit to the surface.

Drill collars are generally thick-walled tubing components provided at a lower end of a drill string to provide weight on the drill bit to ensure efficient cutting. These drill collars may be machined from solid bars of steel or other alloys and may be configured to perform a variety of functions in addition to carrying the drill bit. For example, the drill collars may route fluids to downhole turbines for electricity production, carry sensors or other instruments for monitoring the drilling operation and may provide flexibility to the drill sting to allow a deviated wellbore to be drilled. A single drill collar may be constructed of several distinct materials and may exhibit a complex geometry that is difficult to manufacture.

BRIEF DESCRIPTION OF THE DRAWINGS

The disclosure is described in detail hereinafter, by way of example only, on the basis of examples represented in the accompanying figures, in which:

FIG. 9 is a chart illustrating a comparison of the mechanical properties of a monolithic test sample with a test sample welded in accordance with the present disclosure.

DETAILED DESCRIPTION

The present disclosure describes drill collars and methods of constructing drill collars using solid-state welding processes. Solid-state welding produces robust drill collars with high fatigue lifespans and permits individual segments of the drill collar to be optimized based on their intended use. A drill collar may be formed of a first segment with a different material, density, modulus of elasticity and/or geometry than an adjacent second segment fused thereto. If a segment of a drill collar is damaged in use, the damaged segment may be removed and replaced, possibly without de-rating the drill collar. Methods of forming the solid-state welds may include friction welding adjacent segments to one another such that features in each segment are circumferentially aligned when the weld is formed. Supplemental energy sources may provide additional heat at the welded surfaces to ensure the segments are effectively fused.

Figures 1, 2:
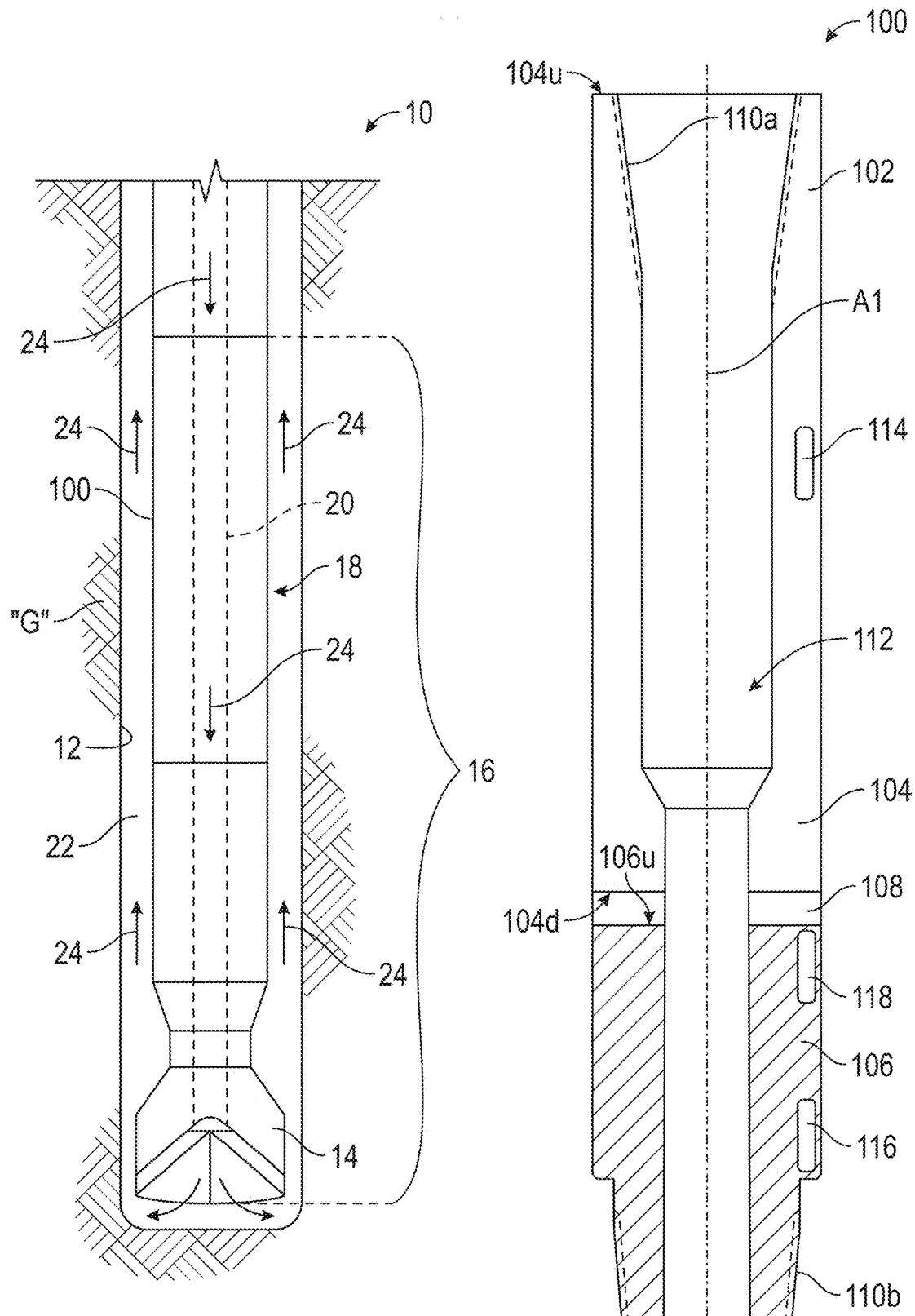
FIG. 1 is a partial, cross-sectional side view of a wellbore system illustrating a lower end of a drill string including a drill collar constructed in accordance with aspects of the present disclosure.
FIG. 2 is a cross-sectional side view of the drill collar of FIG. 1 illustrating a first segment and a second segment fused to one another at a friction weld.

FIG. 1 illustrates a wellbore system 10 in accordance with example embodiments of the present disclosure. A lower end of an example wellbore 12 is illustrated as the wellbore 12 is being drilled into a geologic formation "G" by a drill bit 14. The drill bit 14 is a component of a bottom hole assembly (BHA) 16 that is suspended by a drill string 18 made up of a plurality of subs, drill collars and drill pipes threaded together to form a single tubular string. The drill string 18 defines a flow conduit 20 extending therethrough. During a drilling operation, drilling fluids 24 may be flowed from a surface location downward through the flow conduit 20, out through the drill bit 14 and then returns to the surface location through an annulus 22 defined between the drill string 18 and the geologic formation "G." A drill collar 100 is interconnected within the BHA 16. The drill collar 100 is an example drill collar constructed in accordance with aspects of the present disclosure.

Referring to FIG. 2, the drill collar 100 includes a generally tubular body 102 including a first segment 104 and a second segment 106 fused to one another at a solid-state weld 108 defined therebetween. The first segment 104 includes a drill string connection 110 at an uphole end 104*u* thereof, and the second segment 106 includes a drill string connection 110*b* at a downhole end 106*d* thereof. As illustrated, the drill string connections 110*a*, 110*b* are threaded box and pin connections for securing the drill collar 100 in a drill string as recognized in the art. A central flow path 112 extends along an axis A1 of the drill collar 100 and may form a portion of flow conduit 20 (FIG. 1) when the drill collar 100 is interconnected within a drill string.

The first and second segments 104, 106 may be constructed with different structural and material properties that permit the overall performance of the drill collar 100 to be enhanced. For example, the first segment 104 may be constructed of a material with a first elastic modulus E1 and/or a first density ρ1 while the second segment 106 may be constructed of a material having a second elastic modulus E2 and/or a second density ρ2.

By selecting a lower elastic modulus E1 and a higher elastic modulus E2, for example, may permit the drill collar 100 to be more flexible overall than a drill collar (not shown) constructed of a single material. Fatigue failures in drill collars may be caused by stress reversals produced while the drill collar is being rotated while bent. These stresses may be concentrated in areas of the drill collar 100 where the geometry changes more abruptly along the axis A1. For example, the second segment 106 may include more shoulders and outer profile changes than the first segment 104. Thus, the second segment 106 may be made more rigid than the first segment 104 to allow more flexibility and thus more strain in the first segment 104 of the drill collar 100 where concentrations are not an issue. By increasing the flexibility in low-stress regions of the first segment 104, strain and the corresponding stresses can be reduced in regions of the second segment 106 where stress concentrations are located.

Selecting a lower density ρ1 and a higher density ρ2 may enhance performance of sensors 114, 116 carried by the drill collar 100. For example, selecting a material with a lower density ρ1 for the first segment 104 may permit sensors 114, such as gamma detectors, to realize improved count rates. Selecting a material with a higher density ρ2 may shield sensors 116, such as nuclear detectors, from the associated source instruments 118 associated with nuclear measurements. The detectors 116 may thus provide more reliable readings than if the detectors 116 were carried by drill collar constructed entirely of a material having the lower density lower density ρ1 of the first segment 104.

The solid-state weld 108 is formed at a downhole end 104d of the first segment 104 and an uphole end 106u of the second segment 106. The solid-state weld 108 formed between the segments 104, 106 may permit a single drill collar 100 to be constructed of distinct materials such as CrMnN, CrNiMo as well as materials in Nickel families The joint strength provided by the weld 108 permit the collar 100 to be manufactured with a CrMnN (Class 2) with a CrMoNi (Class 2++) grade at the ends with the drill string connections 110a, 110b. In some embodiments (not show), a solid-state weld 108 may be provided at each end of a drill collar such that a standard API connection may be removed from each end of an existing collar, and a custom drill string connections 110a, 110b may be welded in place. Since conventional welding processes such as Gas Tungsten Arc Welding (GTAW) may result in a significant reduction in mechanical and fatigue properties of a drill collar, about 40% in some cases, the solid-state weld 108 described herein may the permit drill collar 100 to be constructed or repaired with properties more similar to the original materials.

Measurement-While-Drilling (MWD) or Logging-While-Drilling (LWD) tools have surveying equipment, e.g., sensors 114, 116, as a part of the BHA 16 (FIG. 1). Surveying techniques utilized for measuring azimuth orientation are based on measurements of a local magnetic field. Hence any interference that may come from magnetic components of the BHA 16 above and below the sensors 114, 116 may cause erroneous readings of the "raw" azimuth. The use non-magnetic drill collars 100 may eliminate systemic error that could be produced by extraneous magnetic fields. Non-magnetic drill collars 100, segments 104, 106 thereof or other non-magnetic drill stem components may have a relative magnetic permeability of 1.005 or less. Also, in some embodiments, the maximum deviation from a uniform magnetic field must not exceed ±0.05 micro-tesla across the length of the drill collar 100 or other component. This requirement may be achieved with the use of a high-strength austenitic non-magnetic stainless steel in the Cr—Mn—N or Cr—Mo—Ni family. The non-magnetic drill collars 100 and other drill stem components listed above may be manufactured from an austenitic stainless steel alloy. These grades of steels are generally non-heat treatable, and hence may not be heat treated using processes such as tempering, which are frequently employed for alloy steels after high temperature welding processes such as friction welding.

The drill collars 100, segments 104, 106 thereof or other non-magnetic drill stem components described herein may be constructed of chromium-manganese steels that are nitrogen strengthened. The Cr—Mn—N drill collars 100 may contain manganese in a range from about 15% by weight to about 25.5% by weight, chromium in a range from about 13% by weight to about 23% by weight and nitrogen in a range from about 0.25% by weight to about 0.8% by weight. Furthermore, these Cr—Mn—N drill components may have a maximum carbon content of 0.08% by weight and a maximum iron content of about 77% by weight.

The Cr—Mo—Ni containing drill collars 100, segments 104, 106 thereof or other non-magnetic drill stem components described herein may contain manganese in a range from about 3% by weight to about 10.5% by weight, chromium in a range from about 18% by weight to about 30% by weight, molybdenum in a range from about 3% by weight to about 6% by weight and nitrogen in a range from about 0.25% by weight to about 0.8% by weight. Furthermore, these Cr—Mo—Ni drill components may have a maximum carbon content of about 0.08% by weight and a maximum iron content of about 60% by weight.

Both the Cr—Mn—N and the Cr—Mo—Ni containing drill collars 100, segments 104, 106 thereof or other non-magnetic drill stem components described herein may have a minimum tensile yield strength ranging from about 110 KSI (758 MPa) to about 185 KSI (1275 MPa). Additionally, the drill collars 100, segments 104, 106 thereof or other non-magnetic drill stem components may have a minimum Charpy impact toughness value of about 122 Joules (90 ft-lbs) at room temperature. The solid-state weld 108 (as-welded and without any subsequent post weld treatment) may exhibit a minimum yield strength of about 110 KSI (758 MPa) and a Charpy impact toughness of about 50 Joules (36 ft.lbs) at room temperature.

Figure 3:
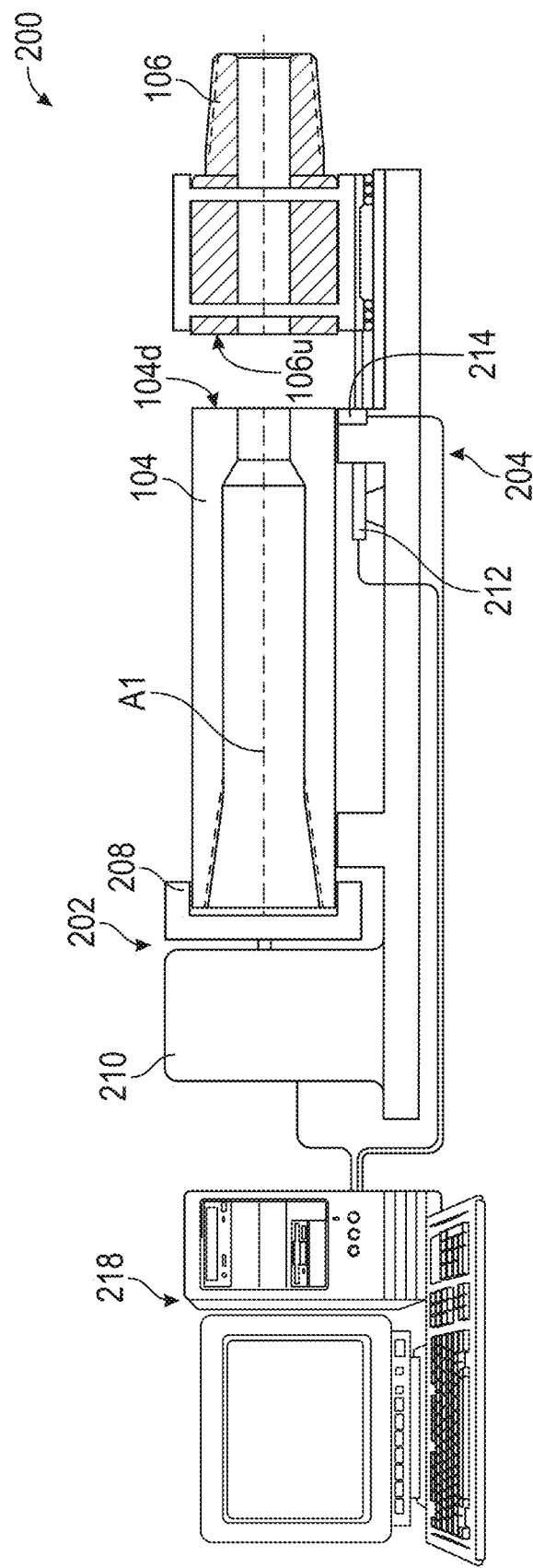
FIG. 3 is a schematic view of a manufacturing apparatus that may be employed for fusing segments of the drill collars in accordance with aspects of the present disclosure.

Referring to FIG. 3, a manufacturing apparatus 200 is illustrated that may be employed for forming a solid-state weld 108 (FIG. 2) that fuses segments 104, 106 to one another in accordance with aspects of the present disclosure. Generally, the apparatus 200 includes a rotational drive 202 for rotating the first segment 104 with respect to the second segment 106 and a longitudinal drive 204 operable to move the second segment 106 longitudinally with respect to the first segment 104. The rotational drive includes clamp 208 for gripping the first segment and a motor 210 for rotating the first segment 104 about the longitudinal axis A1. The longitudinal drive 204 includes a hydraulic piston 212 operable to move the second segment 106 longitudinally along the longitudinal axis A1 into contact with the first segment 104. By contacting the longitudinal ends 104d, 106u of the first and second segments 104, 106 with one another while the first segment 104 is rotating, frictional heat may be generated between the contacting longitudinal ends 104d, 106u of the segments 104, 106. In some embodiments, a supplemental energy supply 214 is positioned to provide additional energy and heat to the to the longitudinal ends of the segments 104, 106. The supplemental energy supply 214 may include, e.g., an electrode to provide electrical energy, a transducer to provide ultrasonic energy, an infrared heater to provide radiative heating, or a similar device to provide supplemental heat energy to the segments 104, 106. With sufficient heat generated, the rotation of the first segment 104 may be decelerated to form the solid-state weld 108 (FIG. 2) between the segments 104 and 106. The deceleration may be induced in part by increasing the longitudinal force supplied between the segments 104, 106. A controller 218 is provided for controlling the rotational drive 202, longitudinal drive 204 and the supplemental energy supply 214 to provide the desired characteristics for solid-state weld 108 (FIG. 2).

In other embodiments (not shown), a manufacturing apparatus may include a rotational drive and a longitudinal drive for both of the segments 104, 106 such that each segment 104, 106 may be rotated about the axis A1 and translated along the axis A1. Alternatively, one of the segments 104 may be held stationary while the other segment 106 is rotated and translated with respect to the stationary segment 104.

Figure 4:
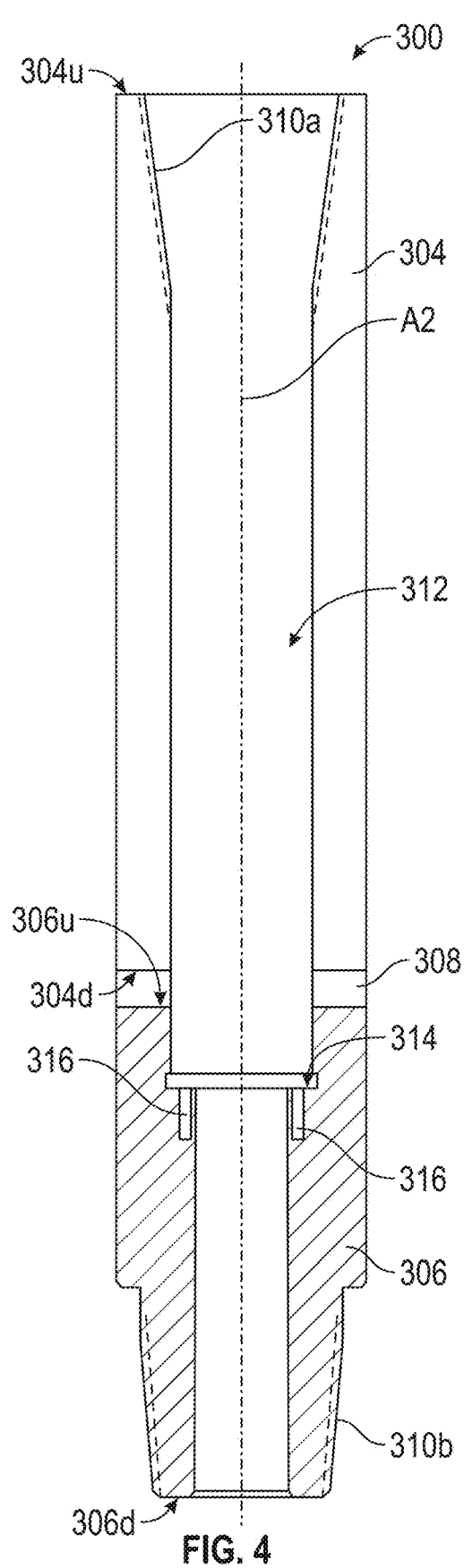
FIG. 4 is a cross-sectional side view of an alternate drill collar constructed of first and second segments fused to one another at a friction weld in accordance with aspects of the present disclosure illustrating a complex interior geometry in the second segment.

Referring to FIG. 4, an alternate drill collar 300 is arranged to include complex geometries machined into interior surfaces thereof. The drill collar 300 includes first and second segments 304, 306 fused to one another by a solid-state weld 308. The solid-state weld 308 is defined between a downhole end 304d of the first segment 304 and an uphole end 306u of the second segment 306. A central flow path 312 extends along an axis A2 between an uphole end 304u of the first segment 304 and a downhole end 306d of the second segment 306. The central flow path 312 generally has a first diameter D1 extending from a drill string connection 310a on the first segment 304 and a second diameter D2 extending from a drill string connection 310b on the second segment 306. A shoulder 314 is defined within the central flow path 312 at an axial location where the central flow path 312 transitions between the first diameter D1 and the second diameter D2. The shoulder 314 faces an uphole direction and the solid-state weld 308. Machined features such as blind holes 316 extend in a downhole direction from the shoulder 314 into the second segment 306. The blind holes 316 may be provided for carrying sensors 116 (FIG. 2) or other devices in the drill collar.

The blind holes 316 may be drilled in the second segment 306 before the first and second segments 304, 306 are joined to one another by the solid-state weld 308. Thus, it is not necessary to extend a drill bit through the central flow path 312 from the uphole end 304u of the first segment 304. Features such as blind holes 308 that may be defined too deep in a one-piece drill collar may be physically impossible or economically unviable. These same features may be machined relatively easily before joining the segments 304, 306 with the solid-state weld 308.

Figure 5:
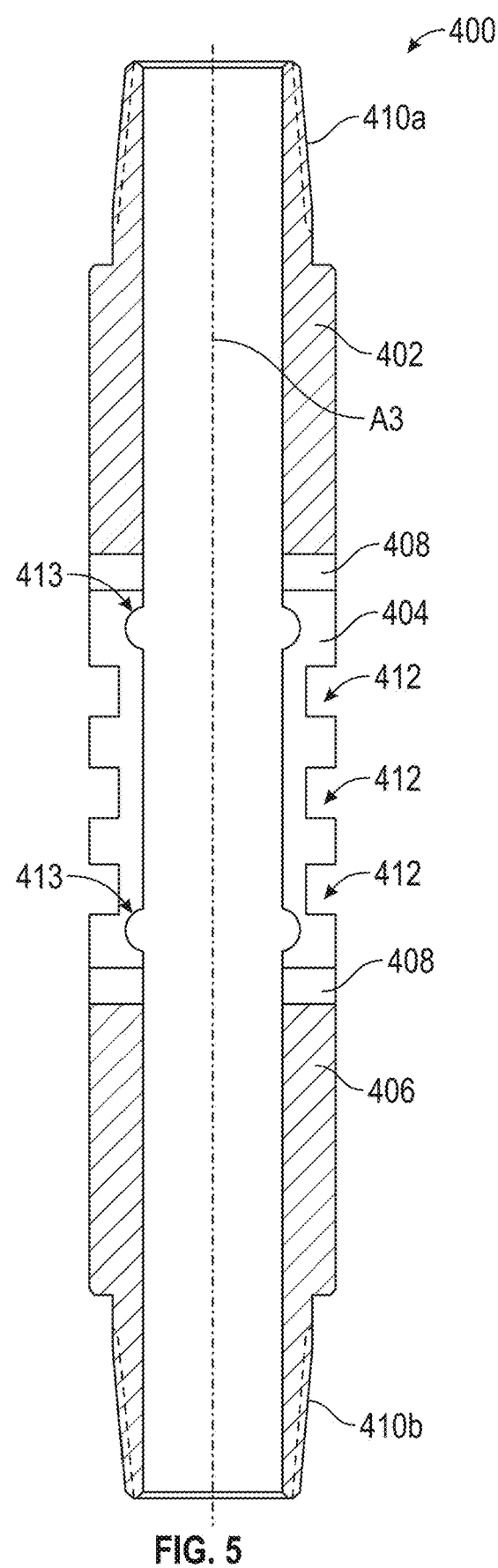
FIG. 5 is a cross-sectional side view of an alternate drill collar constructed of first, second and third segments fused to one another at friction welds in accordance with aspects of the present disclosure illustrating a complex geometry defined on an exterior surface of the second segment.

Referring to FIG. 5, an alternate drill collar 400 is arranged to provide optimal fatigue resistance. The drill collar 400 extends along an axis A3 includes a first segment 402, a second segment 404 and a third segment 406 fused together by solid-state welds 408. The first and third segment 402, 406 may be similar or identical components joined to opposite ends of the second segment 404. The first and third segments 402, 406 include drill string connections 410a, 410b respectively, which are each illustrated as threaded pin connections. A material such as Austenitic Stainless Steel may be selected for the first and third segments 402, 406 to facilitate cold-rolling of threads for the drill string connections 410a, 410b. The cold working responsiveness of austenitic steels makes them suitable for applications that involve high corrosion resistance and strength. The material selected for the first and third segments 402, 406 may thus provide superior fatigue performance of the threaded drill string connections 410a, 410b by facilitating cold working.

The central second segment 404 may include grooves 412 or complex geometries machined in an outer surface thereof. Interior features such as grooves 413 may also be machined into an interior surface of the central second segment 404. Stress concentrations may exist in the grooves or complex geometries that make the second segment 404 unsuitable for cold working. A high fatigue strength material such as Chromium-Nickel-Molybdenum steels may be selected for the central second segment 404. The solid-state welds 408 permit the dissimilar materials of the second segment 404 and the first and third segments to be joined to one another and together to provide fatigue resistance to the drill collar 400.

Figure 6A:
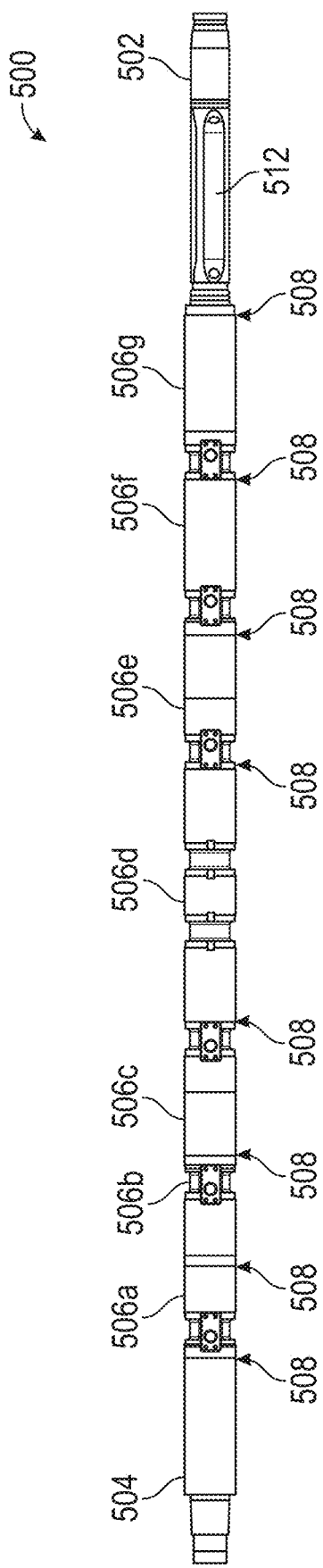
FIG. 6A is a side view of an alternate drill collar constructed of a leading segment, a trailing segment and a plurality of intermediate segments fused to one another at friction welds in accordance with aspects of the present disclosure.

Referring to FIG. 6A, alternate drill collar 500 may be constructed of a leading segment 502, a trailing segment 504 and a plurality of intermediate segments 506a-g fused to one another at solid state welds 508. The underlying structure of the drill collar 500 may be a single collar body greater than 4 meters in length, which may be constructed in smaller components which are more manageable to manufacture. No complex connections are required between the components, which reduces manufacturing and operating costs. In operation, fatigue, erosion corrosion or other conditions may cause on or more segments to become ineffective. If, for example a single segment 506a were to become damaged, this segment 506a may be cut out of the drill collar 500 while the remaining portions of the drill collar 500 remain intact. The segment 506a may be refurbished or replaced, and then rejoined with the other segments with solid-state welds 508. Since most of the drill collar 500 may be salvaged, the solid-state welds 508 may result in significant cost savings in the repair and refurbishment of the drill collar as well as in the original construction of the drill collar 500.

The leading segment 502 includes chambers 512 defined around an exterior thereof for housing sensors or other equipment. The geometry and functionality of the leading segment 512 may be relatively complex with respect to the remainder of the segments 504, 506a-g of the drill collar 500. A specialty material with superior mechanical properties may be selected for the leading segment 512 while a less expensive, standard material may be selected for the remainder of the segments 504, 506a-g.

Figure 6B:
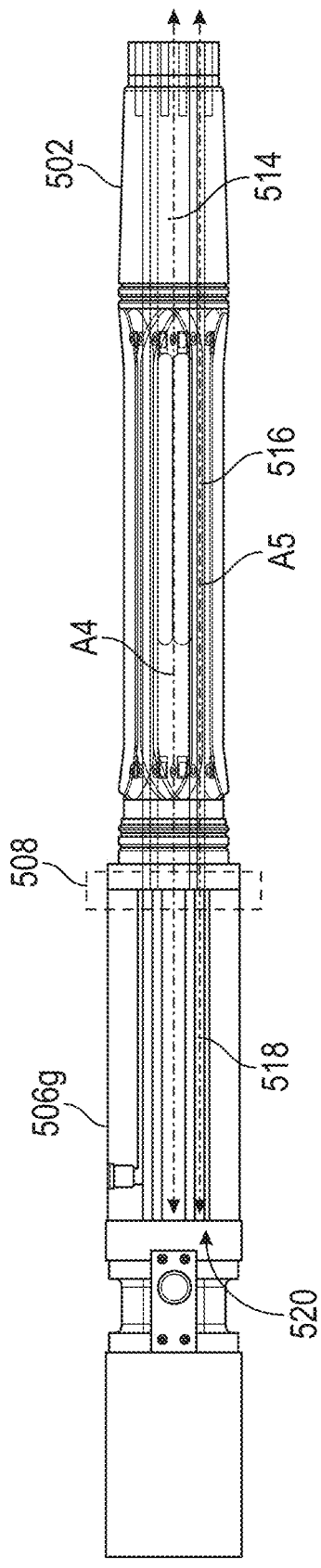
FIG. 6B is a cross-sectional view of the trailing segment and an intermediate segment of the drill collar of FIG. 6A illustrating a gun drilled bore extending therethrough.

As illustrated in FIG. 6B, the first segment 502 includes a central flow channel 514 extending along a central axis A4 and lateral channel 516 extending along an axis A5 that is radially offset from the central flow channel 514. Typically, features such as the lateral channel 516 are manufactured in a special manufacturing process called "gun drilling." Using gun drilling techniques, relatively long and small-diameter bores may be created over the length of the first segment 512. Reliably creating gun drilled bores longer than about 2.5 meters, however, is difficult and may not be possible along the entire length of the drill collar 500. The lateral channel 516 may be aligned with a lateral channel 518 in the adjacent segment 506g, and in this manner, a lateral flow path 520 may be extended through the entire drill collar 500 along a lateral axis A5. Because the solid-state welds 508 are created by rotating adjacent segments 502, 506g with respect to one another, a timed friction welding procedure may be implemented to ensure a predetermined circumferential orientation between the adjacent segments 502, 506g is achieved when the solid-state weld 508 is created. Any debris or material extending into the channels 516, 518 caused by forming the solid-state weld 508 may be removed by extending a drill bit through the leading segment 502. Any irregularities on the exterior of the solid-state weld 508 may be machined to provide a cylindrical outer surface across the solid-state weld 508.

Figure 7:
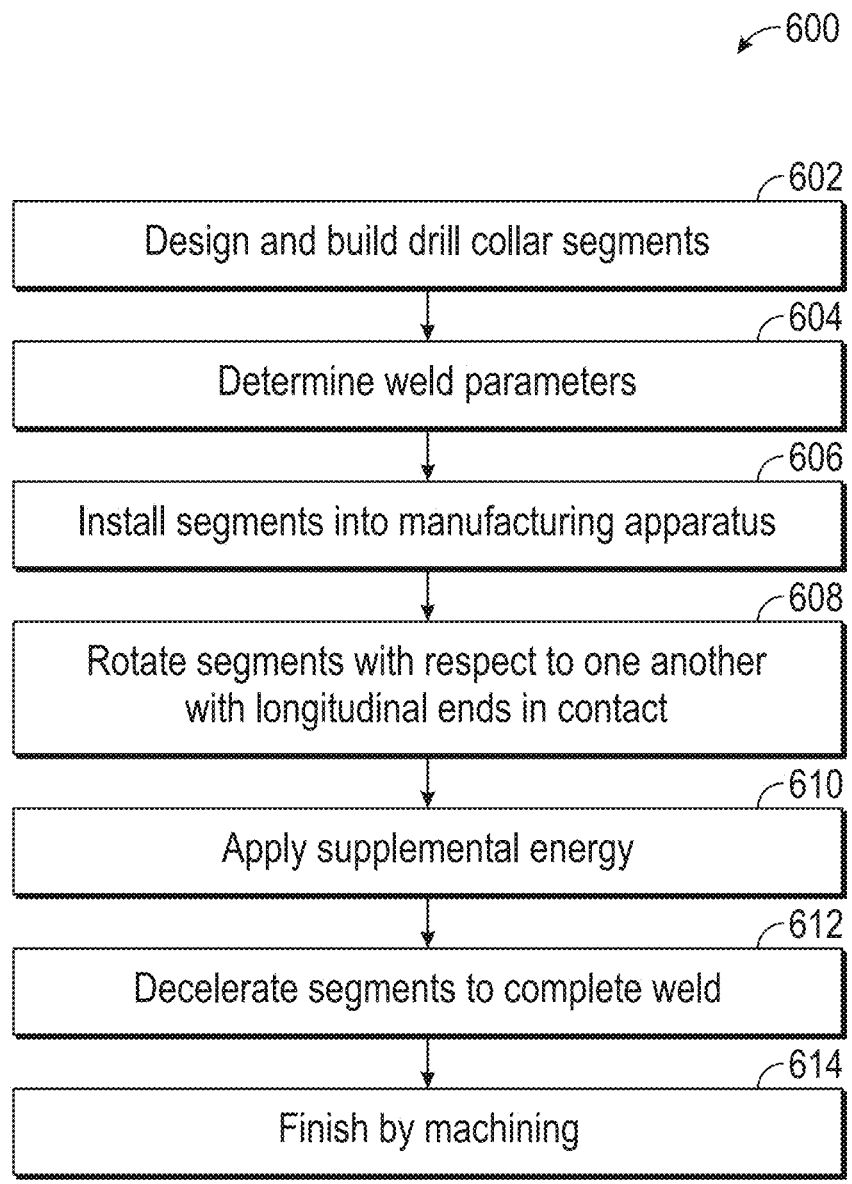
FIG. 7 is a flowchart illustrating procedures for constructing drill collars in accordance with aspects of the present disclosure.

Referring now to FIG. 7, and with continued reference to FIG. 6B and FIG. 3, a procedure 600 for joining segments 502, 506g (FIG. 6B) of a drill collar is described. Initially, at step 602, the geometry and material properties of segments 502, 506g are designed. Dissimilar materials may be selected for each of the segments 502, 506g and each of the segments 502, 506g are constructed from the selected material. Lateral channels 516 and 518 may be gun drilled into the respective segments 502, 506g at respective circumferential positions at the same radial distance from the central axis. When the segments 502, 506g are axially aligned, the channels 516, 518 may circumferentially aligned such that fluid communication may be established between the channels.

At step 604 the weld parameters are determined that will produce the desired solid-state weld 508 with the channels 516, 518 circumferentially aligned. The time or duration "d" of frictional contact, the longitudinal force "F1" applied between the segments during the frictional contact, the temperature "t" of the segments to be achieved, the amount of supplemental energy "E" necessary, the amount of longitudinal force "F2" to be applied during the deceleration of the of the relative rotational motion are all among the parameters that may be determined. The parameters may be derived analytically with mathematical computation, and/or may be determined empirically by experimentation, in some embodiments.

Next, at step 606, the segments 502, 506g may be loaded into a manufacturing apparatus 200 (FIG. 3) operable to rotate the segments 502, 506 g relative to one another. The leading segment 502 may be coupled to the rotational drive 202 and the intermediate segment 506g may be coupled to the longitudinal drive, for example. At step 608, the segments 502, 506g are rotated with respect to one another in frictional contact. The controller 218 may instruct the motor 210 to rotate the leading segment 502. The segment 502 may be rotated through full rotations, e.g., by more than 360 degrees about the central axis A4 or may be oscillated back and forth through a smaller arc, by about 20 degrees or less in some embodiments. The controller 218 may also instruct the hydraulic piston 212 to contact the segments 502, 506g and apply the longitudinal force F1 between the segments 502, 506g. Frictional heat may be generated as the segments 502, 506g are rotated with respect to one another while in contact with one another. Additional energy may be applied to the segments 502, 506g (step 610) with the supplemental energy supply 214 (FIG. 3) until a predetermined temperature is reached, or another predetermined condition is identified. In some embodiments, the controller 218 may include instructions stored therein to discontinue application of energy from the supplemental energy source and/or initiate deceleration of the relative rotation between the segments 502, 506g in response to detecting the predetermined condition.

At step 612, the relative rotation between the segments 502, 506g is decelerated in controlled manner For example, the controller 218 may instruct the motor 210 to slow rotation of the leading segment 502 while simultaneously instructing the hydraulic piston 212 to increase the longitudinal force applied between the segments 502, 506g to a predetermined longitudinal force F2 predetermined to ensure the segments 502, 506g come to rest at a predetermined circumferential orientation with one another. For example, the predetermined circumferential orientation may be an orientation in which the lateral channels 516 in the leading segment 502 is circumferentially aligned with the lateral channel 518 defined in the intermediate segment 506g. In some embodiments, a tolerance of about ±1° may be achieved in the predetermined circumferential orientation. The solid-state weld 508 may be completed once the segments 502, 506g are decelerated and permitted to cool. In some embodiments, the segments 502, 506g may rotate together about the central axis A4 even after the deceleration of the relative rotation between the segments 502, 506g is completed.

At step 614, any final machining may be performed to complete the drill collar 500. Any debris or material extending into the channels 516, 518 caused by forming the solid-state weld 508 may be removed by extending a drill bit through the leading segment 502. Any irregularities on the exterior of the solid-state weld 508 may be machined to provide a cylindrical outer surface across the solid-state weld. 508.

Figure 8B:
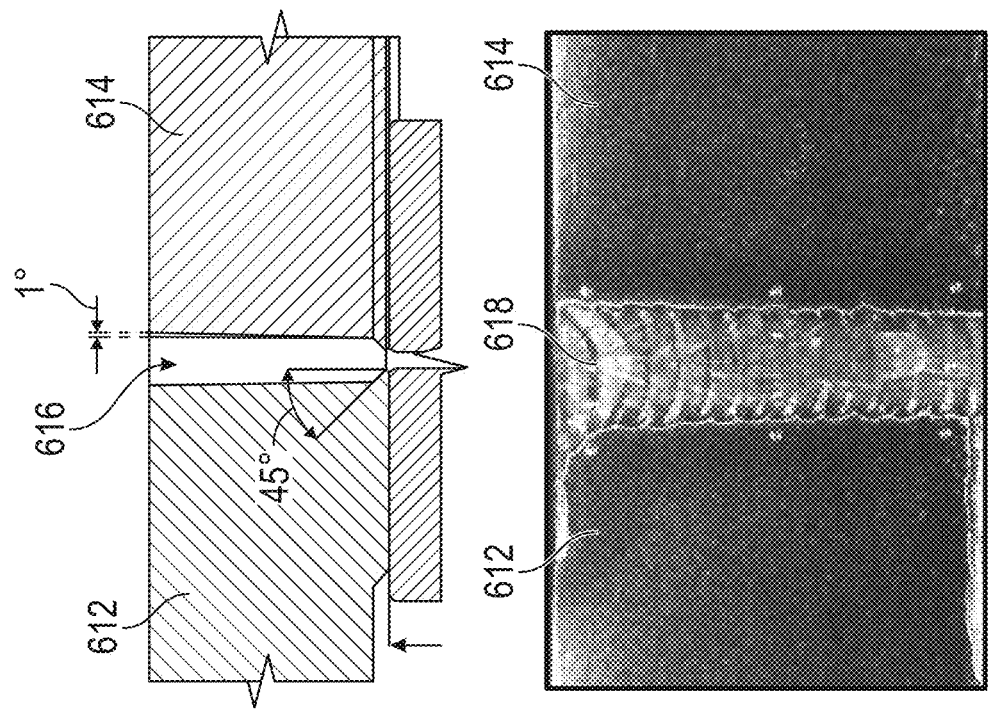
FIG. 8B is a schematic of a traditional narrow-groove weld preparation and a corresponding image of a resulting weld.
Figure 8A:
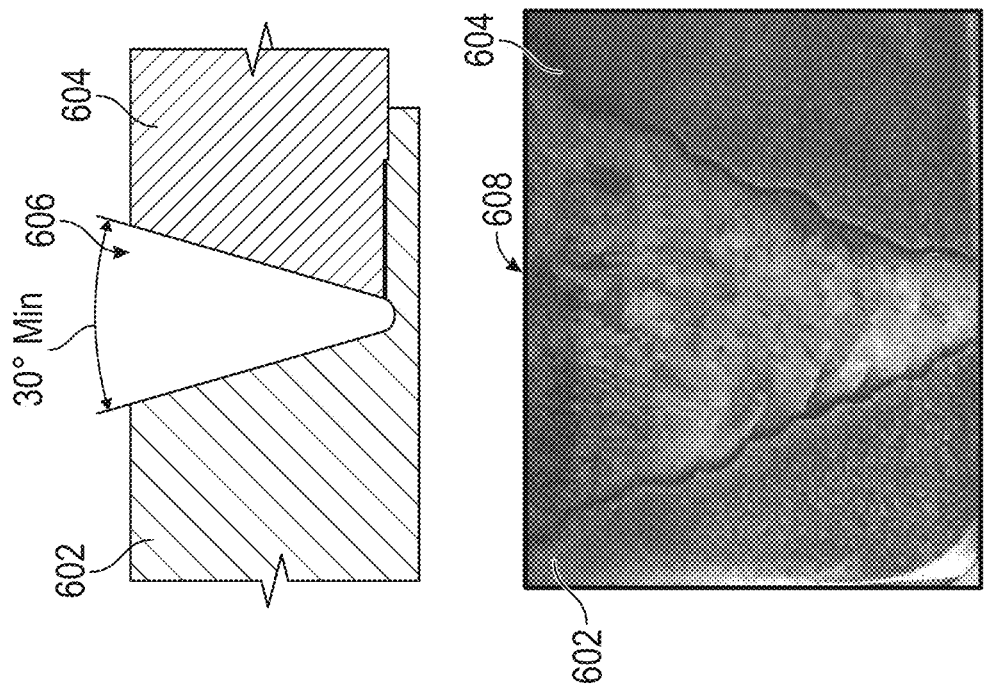
FIG. 8A is a schematic of a traditional v-groove weld preparation and a corresponding image of a resulting weld.

Referring now to FIG. 8A, a traditional weld preparation and completed weld joining a first segment 602 to a second weld segment 604 is illustrated. A V-shaped groove 606 may be established between the first and second segments 602, 604 components, and the V-shaped groove may be filled with a weld alloy 608 to join the parent materials of the first and second segments 602, 604. Similarly, in FIG. 8B an alternate traditional weld preparation and completed weld joining a first segment 612 to a second weld segment 614 is illustrated. A narrow gap 616 may be established between the first and second segments 612, 614, and the narrow gap 616 may be filled with a weld allow 618 to join the parent materials of the first and second segments 612, 614. Regardless of the particular geometry of weld preparation, the introduction of a weld alloy 608, 618 may compromise the integrity of a drill collar or other component generated by these traditional welds.

Figure 8C:
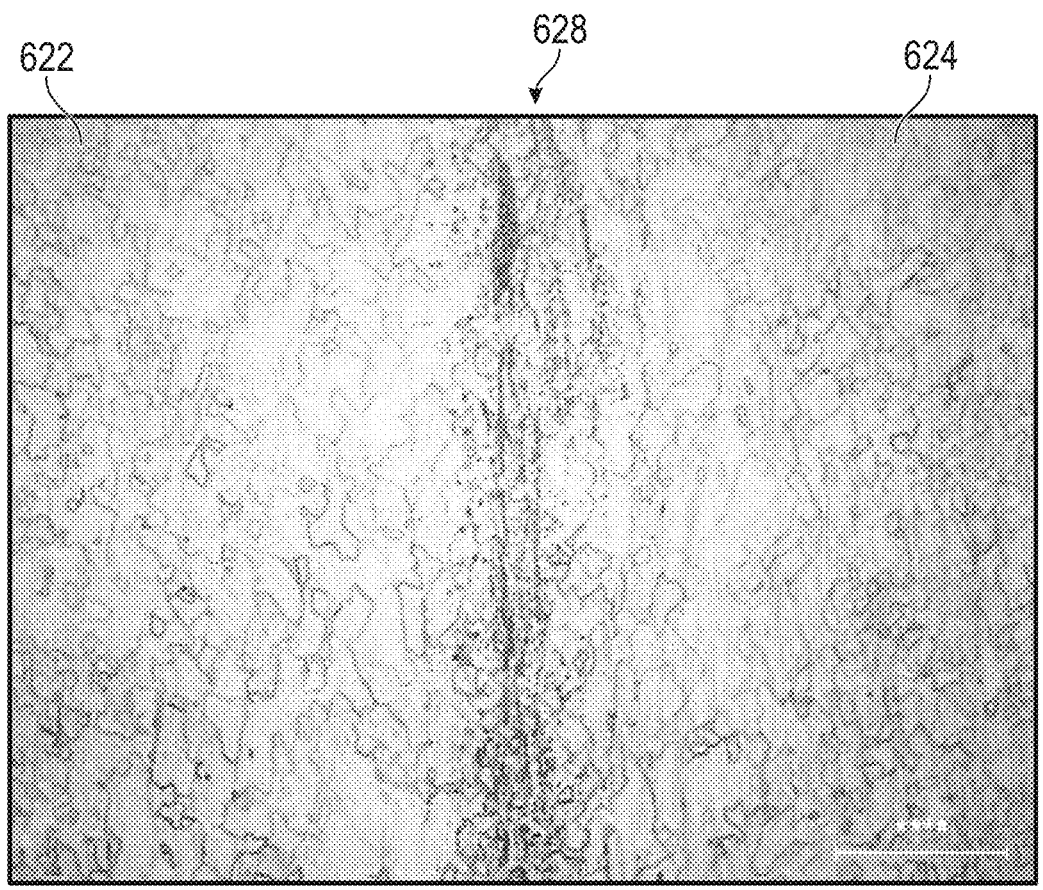
FIG. 8C is an image of a weld generated according to the present disclosure.

As illustrated in FIG. 8C first and second segments 622, 624 are joined to one another with a solid-state weld 628 according to the principles of the present disclosure. The parent material of the first and second segments 622, 224 may be joined directly to one another, which may produce a more robust drill collar.

Referring to FIG. 9, some experimental data is illustrated for drill collars created by joining segments with traditional and sold-state welds in accordance with the present disclosures. The same base material was selected for both groups, e.g., the traditional welds and the solid-state welds. As illustrated in the two columns on the right side of the chart, the drill collars created by the solid-state welds exhibit substantially greater tensile strength and yield strengths.

Figure 10:
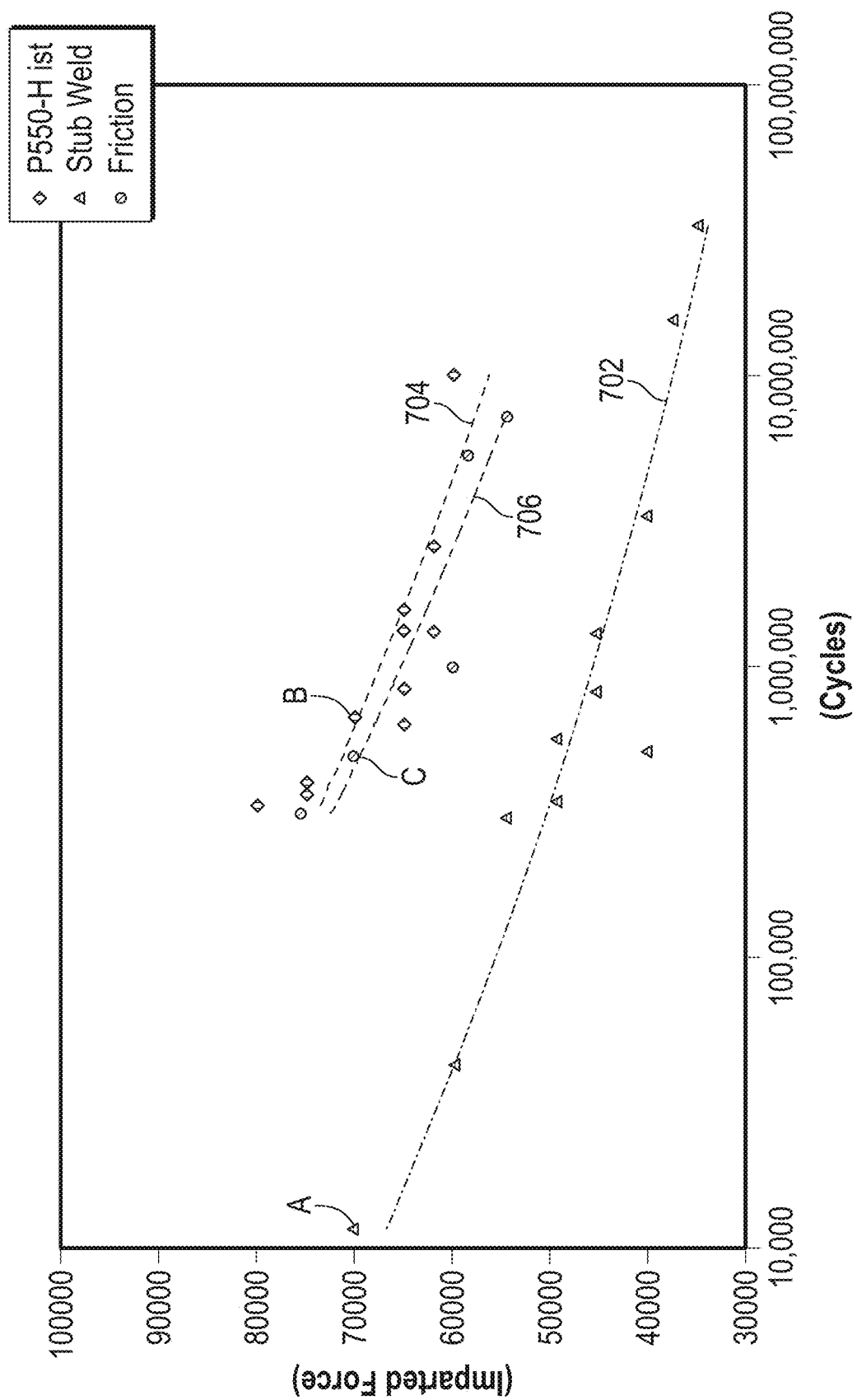
FIG. 10 is a graph illustrating bending fatigue test results for monolithic test samples, test samples using traditional welding methods and test samples welded in accordance with the present disclosure.

Referring to FIG. 10, life cycle testing data is illustrated for monolithic components, traditionally welded components and components generated by solid-state welds according to the principles of the present disclosure. An imparted bending stress for a particular test is illustrated an on the y-axis and the number of cycles until failure is plotted along the logarithmic x-axis. A first curve 702 illustrates traditionally welded components. For higher bending stresses, generally fewer cycles to failure were observed. A second curve 704 illustrates results for monolithic components formed of only a parent material without any welds. These components survived significantly more cycles than the welded counterparts. For example, as illustrated at point A, the traditionally welded component survived for about 10,000 cycles for a given imparted bending stress, while the monolithic components survived form approximately 600,000 cycles for the same imparted bending stress. A third curve 706 illustrates the results for the components generated with the solid-state welds of the present disclosure. The third curve 706 illustrates that the solid-state welds produced components with life cycles more comparable with the monolithic components (curve 704) than the traditionally welded components (curve 704). A point C indicates that the solid-state welds produced a component surviving for approximately 400,000 cycles with the same imparted bending stress as at points A and B described above. Thus, experimental data has illustrated that drill collars constructed in accordance with the present disclosure may be more robust than drill collars constructed by more traditional methods.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

According to one aspect, the disclosure is directed to a method of constructing a downhole drill collar. The method includes rotating a first segment of the drill collar with respect to a second segment of the drill collar about a central axis extending through the first and second segments, applying a longitudinal force between the first and second segments to abut longitudinal ends of the segments while rotating the first segment with respect to the second segment to generate frictional heat between the segments and decelerating the relative rotation between the first and second segments such that first and second segments come to rest at a predetermined circumferential orientation with one another and a solid-state weld is formed between the segments at least in part by the frictional heat generated.

In some embodiments, the method may further include circumferentially aligning a feature defined on the first segment with a feature defined on the second segment by decelerating the relative rotation between the first and second segments. Features defined on the first and second segments may be lateral channels extending through the first and second segments at the same radial distance from the central axis, and the method may further include establishing fluid communication between the lateral channels of the first and second segments when the sold-state weld is formed.

In one or more embodiments, the method further includes increasing the longitudinal force applied between the first and second segments to thereby decelerate the relative rotation between the first and second segments. In some embodiments the method further includes applying supplemental energy to the first and second segments while generating the frictional heat until a predetermined condition is detected. Applying the supplemental energy includes applying at least one of the group consisting of ultrasonic energy, electrical energy and infrared energy. In some embodiments, the method further includes machining interior features into at least one of the first and second segments prior to forming the solid-state weld.

In one or more embodiments, the method further includes forming the solid-state weld between first and second segments constructed of materials differing density such that the first segment has a relatively low density and the second segment has a relatively high density. The method may also include at least one of installing gamma detectors in the first segment or installing a nuclear detector in the second segment. The method may further include forming the solid-state weld between first and second segments constructed of materials differing elasticity such that the first segment has a relatively low elasticity and the second segment has a relatively high elasticity.

In some embodiments, the method further includes constructing the first segment of a material dissimilar from the second segment, fusing a third segment to the second segment at a longitudinal end of the second segment opposite the first segment, forming drill string connections on ends of the first and third segments, cold working the drill string connections and machining features into an exterior and/or interior surface of the second segment.

According to another aspect, the disclosure is directed to a manufacturing apparatus for constructing a drill collar. The apparatus includes a rotational drive operable to rotate a first segment of the drill collar with respect to a second segment of the drill collar about a central axis extending through the first and second segments, a longitudinal drive operable to apply a longitudinal force between the first and second segments to abut longitudinal ends of the segments while the rotational drive rotates the first segment with respect to the second segment to generate frictional heat between the segments and a controller operably coupled to the rotational drive and the longitudinal drive to decelerate the relative rotation between the first second segments such that first and second segments come to rest at a predetermined circumferential orientation with one another and a solid-state weld is formed between the segments.

In some embodiments, the longitudinal drive includes a hydraulic piston operable to move the second segment longitudinally along the central axis into contact with the first segment. The controller may be operably coupled to the hydraulic piston to increase the longitudinal force applied between the first and second segments to thereby decelerate the relative rotation between the first and second segments while the solid-state weld is formed.

In one or more embodiments, the manufacturing apparatus further includes a supplemental energy source operably coupled to the controller to provide additional energy to first and second segments while the frictional heat is being generated. In some embodiments, the supplemental energy source may include at least one of the group consisting of an ultrasonic transducer, an electrical electrode and an infrared heater, and wherein the controller is operable to discontinue application of the supplemental energy in response to a predetermined temperature being detected.

According to another aspect, the disclosure is directed to a drill collar. The drill collar includes a first segment of the drill collar defining a central axis and including a first feature defined at a first circumferential position around the central axis, a second segment of the drill collar extending along the central axis and including a second feature defined at a second circumferential position around the central axis and a solid-state weld formed by friction welding the longitudinal ends of the first and second segments such that the first feature and second feature are disposed at a predetermined circumferential orientation with one another.

In one or more embodiments, the first and second features are gun drilled lateral channels circumferentially aligned with one another at the same radial distance from the central axis such that a lateral flow path extends through the solid-state weld. In some embodiments, the first segment is constructed of a first material having a first density and the second segment is constructed of a second material having a second density greater than the first density, and either a gamma detector is housed in the first segment or a nuclear detector is housed in the second segment. The first and second segments may be constructed of a non-magnetic stainless steel in either the Cr—Mn—N family or Cr—Mo—Ni family The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A method of constructing a downhole drill collar, the method comprising:
    rotating a first segment of the drill collar with respect to a second segment of the drill collar about a central axis extending through the first and second segments;
    applying a longitudinal force between the first and second segments to abut longitudinal ends of the segments while rotating the first segment with respect to the second segment to generate frictional heat between the segments;
    decelerating the relative rotation between the first and second segments such that first and second segments come to rest at a predetermined circumferential orientation with one another and a solid-state weld is formed between the segments at least in part by the frictional heat generated;
    circumferentially aligning a feature defined on the first segment with a feature defined on the second segment by decelerating the relative rotation between the first and second segments, wherein features defined on the first and second segments are lateral channels extending through the first and second segments at the same radial distance from the central axis, and
    establishing fluid communication between the lateral channels of the first and second segments when the sold-state weld is formed.

2. The method of claim 1, further comprising increasing the longitudinal force applied between the first and second segments to thereby decelerate the relative rotation between the first and second segments.

3. The method of claim 1, further comprising applying supplemental energy to the first and second segments while generating the frictional heat until a predetermined condition is detected.

4. The method of claim 3, wherein applying the supplemental energy includes applying at least one of the group consisting of ultrasonic energy, electrical energy and infrared energy.

5. The method of claim 1, further comprising machining interior features into at least one of the first and second segments prior to forming the solid-state weld.

6. The method of claim 1, further comprising forming the solid-state weld between first and second segments constructed of materials differing density such that the first segment has a lower density than the second segment and the second segment has a relatively higher density than the first segment.

7. The method of claim 6, further comprising at least one of installing gamma detectors in the first segment or installing a nuclear detector in the second segment.

8. The method of claim 1, further comprising forming the solid-state weld between first and second segments constructed of materials differing elasticity such that the first segment has a lower elasticity than the second segment and the second segment has a higher elasticity than the first segment.

9. The method of claim 1, further comprising:
    constructing the first segment of a material dissimilar from the second segment;
    fusing a third segment to the second segment at a longitudinal end of the second segment opposite the first segment;
    forming drill string connections on ends of the first and third segments; and
    cold working the drill string connections; and
    machining features into an exterior and/or interior surface of the second segment.

10. The drill collar of claim 1, wherein the first and second features are gun drilled lateral channels circumferentially aligned with one another at the same radial distance from the central axis such that a lateral flow path extends through the solid-state weld.

11. A method of constructing a downhole drill collar, the method comprising:
    constructing a first segment of the drill collar with a material dissimilar from a second segment of the drill collar;
    rotating the first segment of the drill collar with respect to the second segment of the drill collar about a central axis extending through the first and second segments;
    applying a longitudinal force between the first and second segments to abut longitudinal ends of the segments while rotating the first segment with respect to the second segment to generate frictional heat between the segments;
    decelerating the relative rotation between the first and second segments such that first and second segments come to rest at a predetermined circumferential orientation with one another and a solid-state weld is formed between the segments at least in part by the frictional heat generated;
    fusing a third segment to the second segment at a longitudinal end of the second segment opposite the first segment;
    forming drill string connections on ends of the first and third segments;
    cold working the drill string connections; and
    machining features into an exterior and/or interior surface of the second segment.

12. The method of claim 11, further comprising circumferentially aligning a feature defined on the first segment with a feature defined on the second segment by decelerating the relative rotation between the first and second segments.

13. The method of claim 11, wherein features defined on the first and second segments are lateral channels extending through the first and second segments at the same radial distance from the central axis, and wherein the method further comprises establishing fluid communication between the lateral channels of the first and second segments when the sold-state weld is formed.

14. The method of claim 11, further comprising increasing the longitudinal force applied between the first and second segments to thereby decelerate the relative rotation between the first and second segments.

15. The method of claim 11, further comprising applying supplemental energy to the first and second segments while generating the frictional heat until a predetermined condition is detected.

16. The method of claim 15, wherein applying the supplemental energy includes applying at least one of the group consisting of ultrasonic energy, electrical energy and infrared energy.

17. The method of claim 11, further comprising machining interior features into at least one of the first and second segments prior to forming the solid-state weld.

18. The drill collar of claim 11, wherein the first and second features are gun drilled lateral channels circumferentially aligned with one another at the same radial distance from the central axis such that a lateral flow path extends through the solid-state weld.

19. The drill collar of claim 11, wherein the first segment is constructed of a first material having a first density and the second segment is constructed of a second material having a second density greater than the first density, and wherein either a gamma detector is housed in the first segment or a nuclear detector is housed in the second segment.

20. The drill collar of claim 11, wherein the first and second segments are constructed of a non-magnetic stainless steel in either the Cr—Mn—N family or Cr—Mo—Ni family.

* * * * *